(12) United States Patent
Piehl et al.

(10) Patent No.: US 11,598,421 B2
(45) Date of Patent: Mar. 7, 2023

(54) SEAL ARRANGEMENT AND METHOD FOR MANUFACTURING A SEAL ARRANGEMENT

(71) Applicant: BRUSS SEALING SYSTEMS GMBH, Hoisdorf (DE)

(72) Inventors: Mathias Piehl, Hamburg (DE); Gerd Behrends, Hamburg (DE); Lutz Wolter, Hamburg (DE); Bjoern Lindener, Luebeck (DE); Juergen Grundt, Neumuenster (DE); Timo Besoke, Labenz (DE); Manfred Brand, Tremsbuettel (DE); Sebastian Teuscher, Hamburg (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 0 days.

(21) Appl. No.: 17/363,852

(22) Filed: Jun. 30, 2021

(65) Prior Publication Data
US 2022/0003319 A1    Jan. 6, 2022

(30) Foreign Application Priority Data

Jul. 1, 2020    (DE) .......................... 102020208236.7

(51) Int. Cl.
*F16J 15/3256*    (2016.01)
*F16J 15/3248*    (2016.01)
(Continued)

(52) U.S. Cl.
CPC ......... *F16J 15/3256* (2013.01); *F16C 33/726* (2013.01); *F16C 33/7883* (2013.01);
(Continued)

(58) Field of Classification Search
CPC .... F16C 33/726; F16C 33/78; F16C 33/7869; F16C 33/7879; F16C 33/7883;
(Continued)

(56) References Cited

U.S. PATENT DOCUMENTS 3,187,590 A * 6/1965 Duggan .............. F16C 11/0671
403/126
3,572,379 A * 3/1971 Popa ..................... F16K 15/147
277/552
(Continued)

FOREIGN PATENT DOCUMENTS

DE    10 2013 212 073 A1    1/2015
DE    10 2015 220 367 A1    8/2016
(Continued)

OTHER PUBLICATIONS

JP2014-040890 Machine Translation, retrieved Jun. 28, 2022 from espace.net (Year: 2012).*
(Continued)

*Primary Examiner* — Nicholas L Foster
(74) *Attorney, Agent, or Firm* — Saliwanchik, Lloyd & Eisenschenk

(57) ABSTRACT

Provided is a seal arrangement for sealing an internal space between two components mounted for rotation relative to each other, in particular for sealing a wheel bearing. The seal arrangement comprises a first carrier element, which can be connected to the first component, and a second carrier element, which can be connected to the second component. A sealing element is formed on at least one of the carrier elements and rests against the respective other carrier element at least one contact point. It is provided that at least one opening is made in the first carrier element, into which a ventilation element is inserted. It is provided that a receiving space is formed on the ventilation element, which is delimited in the radial direction by a collar on a base body of the ventilation element, wherein a gas-permeable membrane or a porous body is arranged in the receiving space.

19 Claims, 9 Drawing Sheets

(51) Int. Cl.
*F16C 33/78* (2006.01)
*F16C 33/72* (2006.01)
*F16C 33/80* (2006.01)
*F16J 15/3232* (2016.01)
*F16J 15/447* (2006.01)
*F16J 15/3212* (2016.01)
*F16J 15/453* (2006.01)

(52) U.S. Cl.
CPC .......... *F16C 33/80* (2013.01); *F16J 15/3212* (2013.01); *F16J 15/3232* (2013.01); *F16J 15/3248* (2013.01); *F16J 15/4476* (2013.01); *F16J 15/453* (2013.01)

(58) Field of Classification Search
CPC .... F16J 15/164; F16J 15/3212; F16J 15/3248; F16J 15/3256; F16J 15/4476; F16J 15/453
USPC ........................................................ 277/552
See application file for complete search history.

(56) References Cited

U.S. PATENT DOCUMENTS

| | | | | |
|---|---|---|---|---|
| 3,896,849 | A * | 7/1975 | Ervin | F16K 15/147 137/847 |
| 5,492,393 | A * | 2/1996 | Peisker | F16C 33/723 301/108.4 |
| 5,505,525 | A * | 4/1996 | Denton | B60B 27/02 301/108.4 |
| 10,107,337 | B2 * | 10/2018 | Liang | F16J 15/3232 |
| 10,655,680 | B2 * | 5/2020 | Brähler | F16C 33/78 |
| 11,162,536 | B2 * | 11/2021 | Eichelmann | F16C 33/726 |
| 2005/0008272 | A1 * | 1/2005 | Bhat | F16C 33/726 384/477 |
| 2016/0312833 | A1 * | 10/2016 | Liang | F16C 33/7886 |
| 2019/0063499 | A1 * | 2/2019 | Ribeiro | F16C 33/726 |
| 2019/0345982 | A1 | 11/2019 | Brähler et al. | |
| 2020/0300304 | A1 * | 9/2020 | Eichelmann | F16C 33/726 |

FOREIGN PATENT DOCUMENTS

| | | | |
|---|---|---|---|
| DE | 10 2016 206 013 A1 | 10/2017 | |
| DE | 10 2016 125 121 B3 | 5/2018 | |
| DE | 10 2017 102 061 A1 | 8/2018 | |
| DE | 10 2018 121 469 A1 | 3/2020 | |
| DE | 10 2018 125 104 A1 | 4/2020 | |
| JP | H06-12873 U | 2/1994 | |
| JP | 2006-207613 A | 8/2006 | |
| JP | 2014-040890 A | 3/2014 | |
| WO | WO-2011155395 A1 * | 12/2011 | ............ F16C 33/726 |

OTHER PUBLICATIONS

Search Report issued by the German Patent and Trademark Office dated Jan. 29, 2021 with respect to German priority application No.

* cited by examiner

SEAL ARRANGEMENT AND METHOD FOR MANUFACTURING A SEAL ARRANGEMENT

CROSS-REFERENCE TO A RELATED APPLICATION

This application claims priority under 35 U.S.C. § 119(e) of German Patent Application No. DE 10 2020 208 236.7, filed on Jul. 1, 2020, which is incorporated herein by reference in its entirety.

FIELD OF THE INVENTION

The present invention relates to a seal arrangement for a shaft or an axle, in particular for a wheel bearing of a motor vehicle, as well as a method for manufacturing such a seal arrangement, according to the preamble of the independent patent claims.

BACKGROUND OF THE INVENTION

Seal arrangements for rolling bearings are used for many different applications in order to rotatably support a rotating component, in particular a shaft, and to prevent the penetration of dirt or liquid into the bearing area. Furthermore, seal arrangements are known for axles on which a rotating component is rotatably mounted. The bearing arrangement of components that are exposed to strong environmental influences represents a particular challenge, since the ingress of dirt or liquid into the bearing arrangement of these components can lead to damage to the rolling bearing and subsequent failure.

For these applications, for example for wheel bearings of a motor vehicle, appropriately sealed rolling bearings are known which are preceded by a seal arrangement comprising a labyrinth seal and at least one sliding sealing lip to prevent the ingress of dirt and/or liquids into the inner region of the wheel bearing. Since the inner area of the rolling bearing is separated from the environment by the seal, no or only insufficient pressure equalization is possible between the inner area and the environment. This increases friction in the bearing, which leads to a further increase in temperature and pressure in the inner area of the rolling bearing.

From the prior art, cassette seals are known as sealing systems for sealing wheel bearings. Here, a stationary housing is sealed against a rotating shaft or a rotating housing is sealed against a stationary axle. Since the shaft or axle does not have a suitable sealing surface for a shaft seal due to manufacturing or cost reasons, the sealing system in such a cassette seal, in contrast to a shaft seal, has the sealing surface as part of the sealing system.

BRIEF SUMMARY OF THE INVENTION

The primary function of the seal arrangements is to protect the interior against external influences such as the ingress of dirt and water. On the other hand, the seal arrangement has the function of preventing lubricant from escaping from the rolling bearing. A negative pressure inside the wheel bearing presses the sealing lips more strongly against the sealing surface. Likewise, greater external pressure increases the contact pressure of the sealing lips. In both cases, the sealing effect is increased, but this prevents pressure equalization. A high radial preload increases the friction between the sealing lips and sealing surfaces, which also leads to undesirable higher wear and higher operating temperatures. Venting means are known for pressure compensation in wheel bearings, such as a membrane or vent holes or defects in the contact area of the sealing lip.

DE 10 2013 212 073 A1 describes a wheel bearing in which a wheel of a motor vehicle can be mounted on a wheel carrier which is mounted rotatably relative to the motor vehicle via a double-row rolling bearing unit. A double-row rolling bearing is arranged on a wheel hub of the wheel bearing, which comprises a cavity between the first row of rolling elements and the second row of rolling elements. Temperature fluctuations, for example due to operational heating of the wheel bearing, can cause negative pressure situations in this cavity. In the case of a sealed rolling bearing, this negative pressure can lead to a considerable increase in the coefficient of friction at the seal and thus to increased consumption of the motor vehicle. In addition, the higher friction can cause the seals to wear more quickly, wherein water can enter the rolling bearing and ultimately lead to failure of the rolling bearing.

DE 10 2015 220 367 discloses a sealed rolling bearing. The rolling bearing comprises rolling elements which are guided in a bearing inner space between an outer bearing ring and an inner bearing ring, wherein the bearing rings are rotatable relative to each other. For sealing the bearing inner space, the bearing rings enclose on both axial sides a sealing element associated with the bearing ring, the elastic sealing lip of which is supported on the opposite bearing ring in an indirect or direct sealing manner. Furthermore, the rolling bearing comprises a venting means for pressure equalization of the bearing interior, wherein at least one slot valve is formed as venting means in each sealing lip of the sealing element. The slot valve is formed by slots introduced in a cross shape into the sealing lip of the sealing element.

DE 10 2018 121 469 A1 discloses a seal arrangement for sealing a wheel bearing of a motor vehicle. The seal arrangement comprises a stiffening plate that is connected to one of the two bearing parts, wherein an elastic element is provided on the stiffening plate. The elastic element comprises at least one sealing lip. A cavity is formed between the first bearing part and the second bearing part of the seal arrangement, which cavity is delimited by means of the stiffening plate and/or the elastic element. For pressure equalization of the cavity, the seal arrangement includes a venting means. For this purpose, an opening is provided on the stiffening plate, in which a rivet is fixed that carries a ventilation membrane.

However, a disadvantage of the known solutions is that the sealing elements are subject to corresponding wear or require an elaborate holding structure, which makes the seal arrangement complex and expensive, or the ventilation element is not optimally fixed.

It is the task of the invention to propose a sealing element which allows a functionally reliable sealing of a rolling bearing as well as a pressure compensation between the inner area of the rolling bearing and the environment.

According to the invention, the task is solved by a seal arrangement for sealing an internal space between two components mounted rotatably relative to each other, in particular for sealing a wheel bearing. The seal arrangement comprises a first carrier element which can be connected to the first component and a second carrier element which can be connected to the second component. A sealing element is formed on at least one of the carrier elements and rests against the respective other carrier element at least one contact point. At least one opening is incorporated into the first carrier element, into which a ventilation element is inserted.

It is provided that a receiving space is formed on the ventilation element, which is delimited by a collar on a base body or housing of the ventilation element, wherein a gas-permeable membrane or a porous body is arranged in the receiving space. Through the opening in the first carrier element, ventilation of the internal space is possible. In this case, the ventilation element is arranged in the first carrier element in such a way that it completely covers the opening in the first carrier element and prevents further penetration of moisture or dirt into the internal space in an operationally reliable manner.

Due to the porosity of the membrane or the porous body, a limited gas exchange between the environment and the internal space can take place, but a passage of liquid or dirt particles is inhibited by the porous body. The porous body is preferably formed as an air-permeable polymer, in particular an air-permeable polytetrafluoroethylene (PTFE). Alternatively, the air-permeable body may be formed as a metal foam or other gas-permeable foam. Compared to the prior art, the arrangement of the porous body in the ventilation element enables a simplified assembly of the seal arrangement, since the porous body or membrane is not connected to one of the carrier elements, but is inserted into the ventilation element. This allows a simple automated assembly, where the porous body or membrane is inserted into the ventilation element and the ventilation element is inserted into the opening in the carrier element. This can prevent the porous member or membrane from shifting in the manufacturing process and causing a leak at the seal arrangement.

Advantageous further developments and improvements of the seal arrangement according to the invention are provided by the features presented in the dependent claims.

In a preferred embodiment of the invention, it is provided that at least one web, advantageously two webs, are formed on the base body or housing of the ventilation element, which are accommodated in the opening in the first carrier element, wherein the at least two webs are optionally separated from one another by a recess. By means of one or more flexible webs, the base body can be inserted particularly easily into the opening in the first carrier element and then connected to the latter.

It is particularly preferred if a latching lug is formed on one end portion of the web or webs, wherein the latching lug connects the ventilation element to the first carrier element in a form-fitting manner. The latching lug allows the ventilation element to be fixed in the opening of the first carrier element in a simple manner.

In an advantageous embodiment of the ventilation element, it is provided that the receiving space is closed by a cover on the side facing away from the first carrier element. By means of a cover, it can be prevented in a simple manner that the membrane falls out of the receiving space. The cover preferably comprises a central opening and is connected to the base body of the ventilation element in a form-fitting, material-fitting or force-fitting manner. In this embodiment, the housing comprises the base body and the cover.

In a preferred embodiment of the invention, it is provided that the membrane or the porous body is in a material-locking connection with the ventilation element. By means of a material-locking connection between the membrane or the porous body and the base body of the ventilation element, an operationally reliable fixing of the membrane can be achieved. Here, assembly can be facilitated by a simple geometry of the base body.

In an advantageous embodiment of the invention, it is provided that a contact surface is formed on the base body or housing of the ventilation element, against which the membrane or the porous body rests. By means of a contact surface, a smooth sealing contour can be formed between the membrane and the base body of the ventilation element. This can increase the sealing effect in the ventilation element.

It is particularly preferred if at least one dome is formed on the contact surface. Preferably, two or three domes are formed to enable the membrane or porous body to be evenly in contact. A dome can increase the surface pressure acting on the diaphragm. Thus, the sealing between the contact surface in the base body and the membrane can be improved.

In a further preferred embodiment of the ventilation element, it is provided that the collar comprises a deformation region which is shaped in such a way that a retaining portion for the membrane or the porous body is formed. In this way, the membrane or the porous body can be fixed in a simple manner in a form-fitting manner in the receiving space of the ventilation element.

In an advantageous embodiment of the seal arrangement, it is provided that a projection is formed on the sealing element, which projects beyond an end face of the first carrier element, wherein the collar of the ventilation element is enclosed in the projection or the collar is sheathed by the projection at least in portions. By means of a sheathing or an encasement of the ventilation element, centrifugal forces acting on the ventilation element can be absorbed and the sealing in the radial direction can be improved. Thus, the sealing effect of the sealing element can be improved.

It is preferable if a collar is formed on the projection, which comprises an undercut for form-fitting seating of the ventilation element. A further form-fitting connection between the sealing element and the ventilation element is possible by means of an undercut on the collar, whereby a particularly stable fixing and sealing of the ventilation element in the first carrier element is possible.

In a further improvement of the invention, it is provided that a relief groove is formed on the sealing element in a receiving region for the ventilation element. This makes it possible to reduce the forces when pressing the ventilation element into the first carrier element and to reduce the mechanical load for the connection between the ventilation element and the first carrier element.

In a preferred embodiment, the at least one opening is provided as a drilled hole or is punched or cut out of the first carrier element. One or more holes can be easily and inexpensively made in the first carrier element during manufacture of the first carrier element. In a preferred production of the first carrier element as a stamped and bent part, the at least one opening can be introduced into the first carrier element simply and inexpensively by means of a stamping or fine blanking process. Preferably, several openings are provided, preferably evenly distributed over the circumference of the carrier element, each of which can be closed by a ventilation element.

In an advantageous embodiment, the at least one opening is made in a portion of the first carrier element which extends essentially perpendicular to the surfaces of the components. The two components, which can be rotated relative to one another, comprise two parallel surfaces in a sectional plane, between which a rolling bearing can be arranged in order to allow rotation of the first component relative to the second component. The portion extending in a substantially perpendicular direction is understood to be a direction extending in a sectional plane perpendicular to the two parallel surfaces and overcoming the space between the first component and the second component. An opening in the perpendicular portion of the first carrier element makes it particularly easy to ventilate the internal space.

In a preferred embodiment, it is provided that the porous body is designed as a disc, preferably as a disc made of an air-permeable polymer material, in particular of an air-permeable, open-pored polytetrafluoroethylene (PTFE). Since the receiving space in the ventilation element is designed as an annular space, a disk can be arranged particularly easily in this receiving space. By being arranged in the receiving space, the disc is particularly well protected during assembly and operation, which prevents damage to the disc and increases the durability of the seal arrangement.

Due to its omniphobic properties, polytetrafluoroethylene is particularly well suited for preventing water from entering the internal space shielded by the seal arrangement and/or lubricant from escaping from the internal space. In addition, due to its material properties, polytetrafluoroethylene is particularly suitable for the production of a porous, air-permeable body in a comparatively simple and inexpensive sintering process.

In an advantageous embodiment of the seal arrangement, a sealing gap is formed between the first carrier element and the second carrier element. An inlet-side sealing gap inhibits the ingress of dirt or liquid into the bearing arrangement. This can prevent damage to the ventilation element or impairment of its functionality.

In a preferred embodiment of the seal arrangement, it is provided that the first carrier element and/or the second carrier element are coated at least in sections with a sealing material. By coating the carrier elements, a seal can be formed particularly simply and inexpensively. In addition to a material connection, a form-fit connection can also be formed, whereby the sealing element can be formed on the respective carrier element in a particularly stable manner.

It is preferable if a sealing lip is formed on the first carrier element or on a sealing element connected to the first carrier element, which defines a sealing space between the first carrier element and the second carrier element. A sealing lip can be used to easily prevent liquid or dirt from penetrating into the inner region of the seal arrangement.

It is particularly preferred if the sealing lip abuts a counter surface on a portion of the second carrier element which extends substantially parallel to a surface of the two components. One or more sealing lips can be formed between the first carrier element and the second carrier element. It is preferred if the sealing lip is preceded by one or more protective lip(s), which prevents dirt or splash water from entering the sealing area in the axial direction and rests against a contact point on the vertical portion of the second carrier element.

Alternatively or additionally, it is advantageously provided that a protective lip is formed on the first carrier element or a sealing material connected to the first carrier element, which lip rests at a contact point on a portion of the second carrier element that extends perpendicular to the surfaces of the components. Furthermore, a second protective lip is provided, which abuts against the portion of the second carrier element extending parallel to the surface of the second component or against the shaft and protects the sealing area in the radial direction.

In an advantageous embodiment of the seal arrangement, it is provided that the opening in the first carrier element fluidically connects the internal space with one of the sealing spaces. In this case, a first sealing space is delimited by the first carrier element, the second carrier element and the first sealing lip. Furthermore, a second sealing space is delimited by the first protective lip and the sealing lip and the second carrier element. Thereby, the first sealing space is connected to the environment via the sealing gap, so that a simple gas exchange can take place between the first sealing space and the environment. Through the opening, the first sealing space is connected to the sealed internal space, but the opening is protected from penetrating contamination by the sealing gap. Thus, the operational reliability and lifetime of the seal arrangement can be increased.

In a preferred embodiment of the seal arrangement, the first carrier element is designed to be free of sealing material in the area of the opening. To enable easy insertion of the opening in the first carrier element, it is advantageous if the first carrier element is not covered with a sealing material in this area. Furthermore, it is also advantageous in operation if this area is free of a sealing material in order to enable stable engagement of the ventilation element in the opening of the first carrier element.

According to the invention, a method for manufacturing a seal arrangement according to the invention is proposed, wherein an opening is made in the first carrier element, wherein a ventilation element is inserted into the opening to enable pressure equalization between the internal space sealed by the seal arrangement and the environment. By such a method, a seal arrangement can be manufactured in a simple manner, which allows a pressure equalization between the sealed internal space and the environment. The manufacturing process is simplified, since the ventilation element can optionally be purchased and then only needs to be inserted, for example clipped in, at the manufacturer of the seal arrangement. Alternatively, the ventilation element can also be manufactured by the manufacturer of the seal arrangement.

In an advantageous embodiment of the process, the at least one opening is made in the first carrier element by means of a punching or cutting process. Since the first carrier element is preferably manufactured as a stamped and bent part, the opening can be introduced essentially cost-neutrally during the manufacture of the first carrier element, which enables particularly cost-effective manufacture.

Alternatively, it is advantageously provided that the at least one opening is introduced into the second carrier element by means of a drilling, milling or eroding process. In this case, the opening is made in the second carrier element before the second carrier element is covered with the sealing element or the sealing element is applied to the carrier element in an injection molding or vulcanization process. In an advantageous embodiment of the process, it is provided that an edge region around the opening in the carrier element is recessed during the application of the sealing element. This allows the latching hooks of the ventilation element to latch onto the material of the carrier element, which is dimensionally stable compared to the sealing element, facilitating latching and making the connection between the ventilation element and the carrier element more stable.

In a preferred embodiment of the method, it is envisaged that the membrane or the porous body, in particular the air-permeable disc, is connected to the base body of the ventilation element by a material bond and/or by a form fit. A permanently stable and reliable connection between the ventilation element and the membrane or the porous body can be achieved by a material connection, in particular by bonding the membrane or the porous body to the contact surface of the ventilation element. By means of an additional form-fitting through a shoulder on the porous body and/or the first carrier element, an additional connection can be realized which fixes the porous body in its position.

BRIEF DESCRIPTION OF THE FIGURES

The invention will be explained below by means of preferred embodiments with reference to the accompanying figures. Identical components or components with the same function are marked with the same reference numbers in the various figures. Therein shows

In FIGS. 1 and 2, embodiments of an advantageous seal arrangement 10 for sealing an intermediate space 72 between two components 50, 52, 70 which can be rotated relative to one another, in particular for a wheel bearing, are shown. The seal arrangement 10 comprises a first carrier element 12 which is connectable to a first component 70, in particular to a housing. The seal arrangement 10 further comprises a second carrier element 14, which is connectable to a second component 50, 52, in particular a shaft 50 or an axle 52, wherein the first component 70 and the second component 50, 52 are rotatable relative to each other. The seal arrangement 10 seals off an internal space 72 from the environment. Thereby, a sealing gap 28 is formed between the first carrier element 12 and the second carrier element 14 in the manner of a simplified labyrinth seal.

Figure 1:
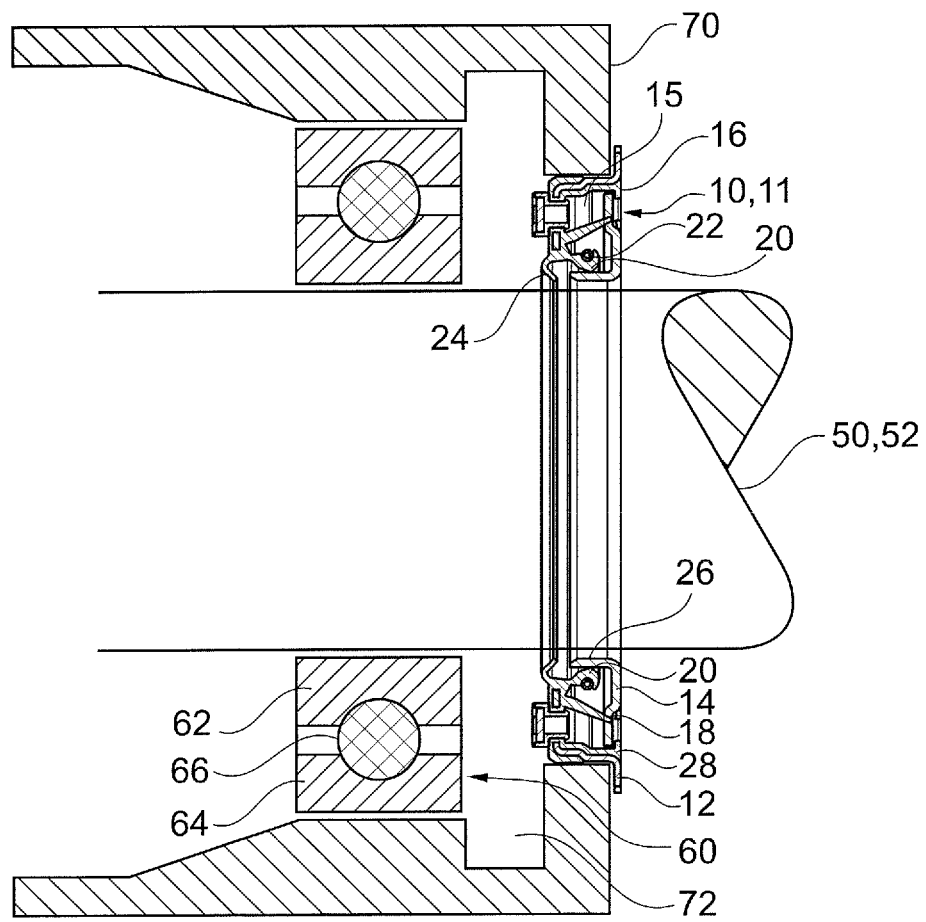
FIG. 1 shows an embodiment of a seal arrangement for sealing a shaft or axle using the example of a wheel bearing.

The first carrier element 12 carries a sealing element 16, which is connected to the first carrier element 12 in a material-locking manner, preferably by means of an injection molding process. A first protective lip 18 is formed on the sealing element 16, which lip abuts at a contact point 46 on a portion 53 of the second carrier element 14, which portion extends substantially perpendicularly to the surfaces of the first and second components 50, 52, 70. Further, a sealing lip 20 is formed on the sealing element 16, which lip abuts a counter surface 26 of the second carrier element 14 at a contact point 45 which is parallel to the surface of the second component 50, 52.

The first carrier element 12, the second carrier element 14 and the first sealing lip 20 delimit a first sealing space 15, which is connected to the environment by the sealing gap 28 between the first carrier element 12 and the second carrier element 14 and enables pressure equalization between the first sealing space 15 and the environment. Furthermore, a second sealing space 17 is formed between the first protective lip 18, the second carrier element 14 and the sealing lip 20, which protects the sealing lip 20 and prevents further penetration of dirt or liquid towards the internal space 72.

The first sealing element 16 is preferably made of a polymer material, in particular an elastomer, and is materially bonded to the first carrier element 12. Furthermore, a catch pocket can be formed on the sealing element 16, which catches dirt or liquid that has penetrated through the sealing gap 28 into the first sealing space 15 and conveys it back out through the sealing gap 28 when the components 50, 52, 70 rotate due to the centrifugal force. Furthermore, a second protective lip 24 is formed on the sealing element 16, which protects the sealing lip 20 from lubricant escaping from the internal space 72 and rests against the shaft 50, the axle 52 or the counter surface 26 of the second carrier element 14.

A rolling bearing 60 is disposed between the first component 70 and the second component 50, 52 to allow relative rotation of the first component 70 with respect to the second component 50, 52. The rolling bearing 60 includes an inner ring 62 in contact with the second component 50, 52 and an outer ring 64 in contact with the first component 70. A plurality of rolling elements 66 are disposed between the inner ring 62 and the outer ring 64 to allow low friction rotation of the inner ring 62 relative to the outer ring 64.

Figure 2:
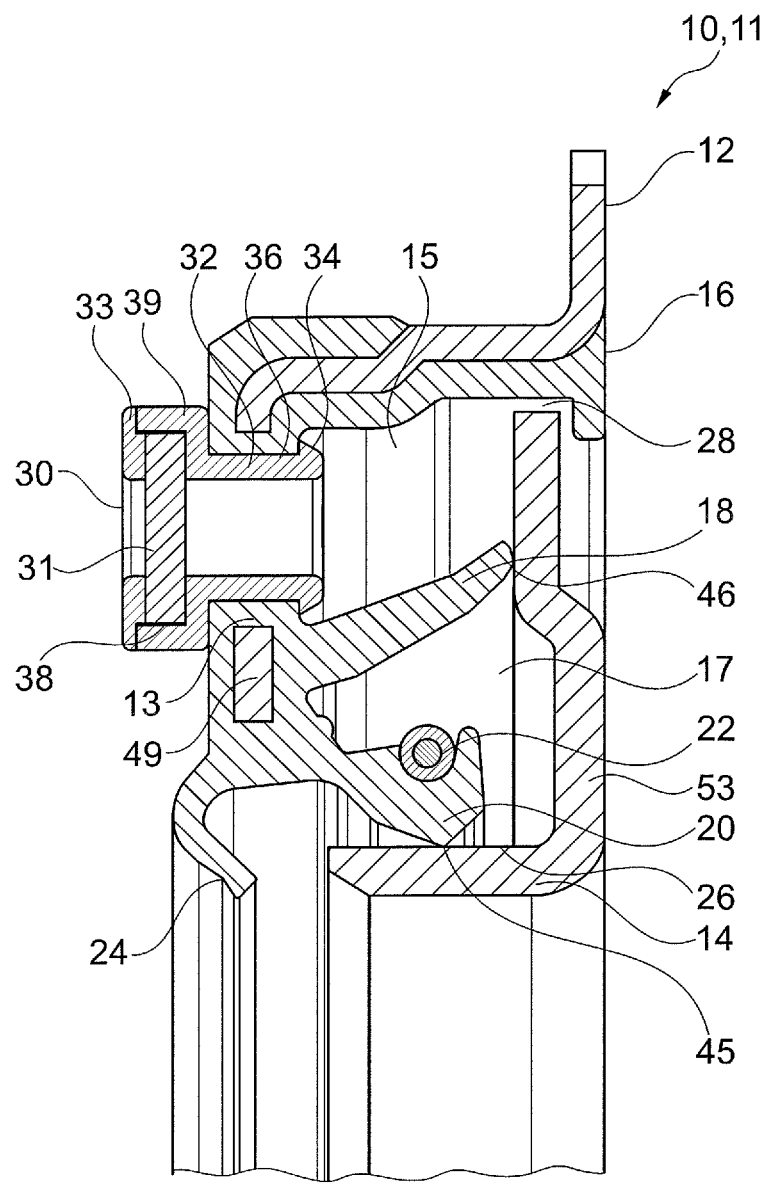
FIG. 2 shows an embodiment of a seal arrangement in a sectional view.

FIG. 2 shows an example of a seal arrangement 10 according to the invention, to which the previous description is largely transferable and which is not repeated here. The seal arrangement 10 is preferably designed as a cassette seal 11. The seal arrangement 10 comprises a first carrier element 12, which is connectable to the first component 70. A further protective lip 24 is also formed on the first carrier element 12, which protects the sealing lip 20 from grease or oil escaping from the bearing. The seal arrangement 10 further comprises a spring 22, with which the seal arrangement 10 can be preloaded in a receptacle.

The first carrier element 12 comprises a first portion which abuts the surface of the first component 70, and a second portion 49 extending substantially perpendicularly thereto. At least one opening 13 is formed in the second portion 49 of the first carrier member 12. The first carrier element 12 is preferably designed as a metal sheet and is manufactured as a stamped and bent part, wherein the at least one opening 13 is already introduced into the carrier element 12 during the stamping of the sheet metal part and can be implemented in a substantially cost-neutral manner without an additional manufacturing step. Alternatively, the at least one opening 13, in particular a bore, can also be introduced subsequently into the first carrier element 12 by drilling, milling, eroding or the like.

A ventilation element 30 is inserted into the opening 13. The ventilation element 30 comprises a base body 32, on which a collar 39 is formed, which delimits a receiving space 38. A membrane 31 is arranged in the receiving space 38, which enables an air exchange between the internal space 72 and the environment. The ventilation element further comprises a plurality of webs 36, at each end of which a latching hook 34 is formed to fix the ventilation element 30 in the opening 13. Furthermore, a cover 33 may be provided on the ventilation element 30 to fix the membrane 31 in the receiving space 38.

Figure 3:
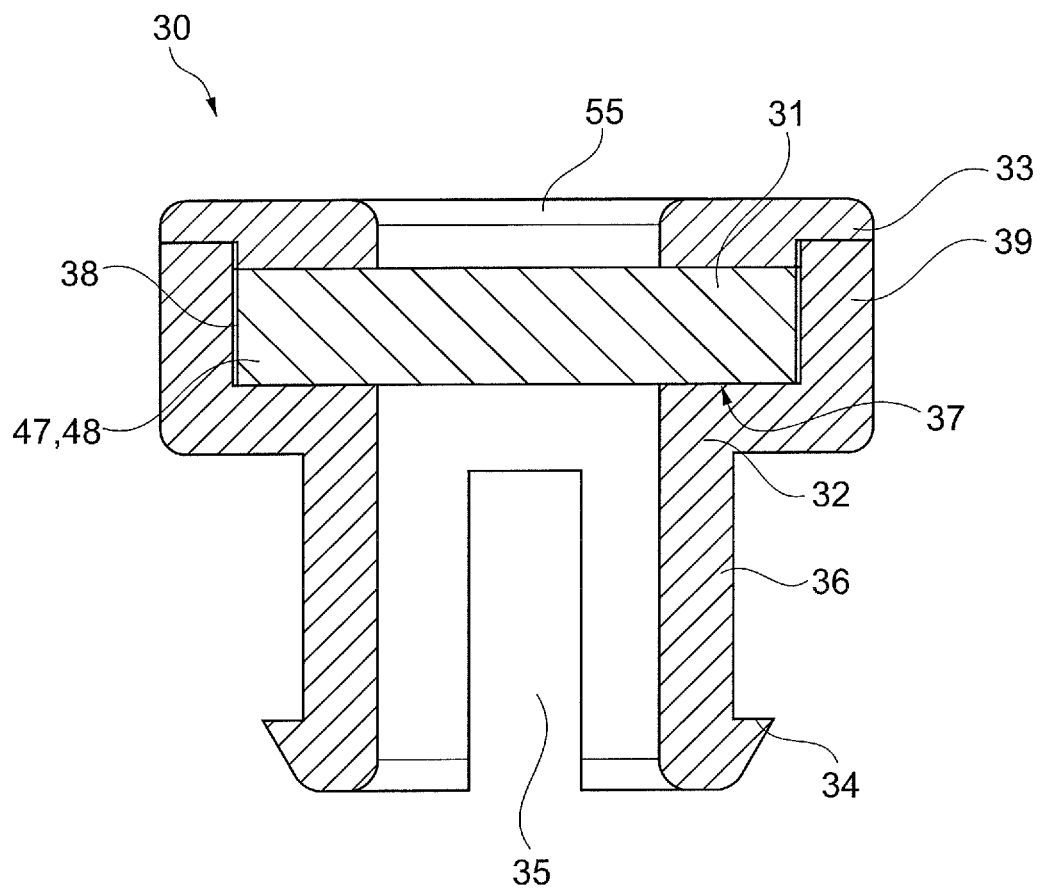
FIG. 3 a preferred embodiment of a ventilation element for such a seal arrangement.

In FIG. 3, a ventilation element 30 for a seal arrangement 10 according to the invention is shown. The ventilation element 30 comprises a base body 32, on which a plurality of elastic webs 36 are formed, which are separated from each other by a recess 35. A latching lug 34 is formed at the ends of each of the webs 36. The base body 32 also encloses a collar 39, which delimits a receiving space 38 for an air-permeable membrane 31. A contact surface 37 is also formed on the base body 32, against which the membrane 31 rests. The base body 32 can be closed by a cover 33 with a preferably centric opening 55 in order to fix the membrane 31 in the receiving space 38. As an alternative to a membrane 31, a porous body 47, in particular a porous disc 48, can also be arranged in the receiving space 38.

Figure 4:
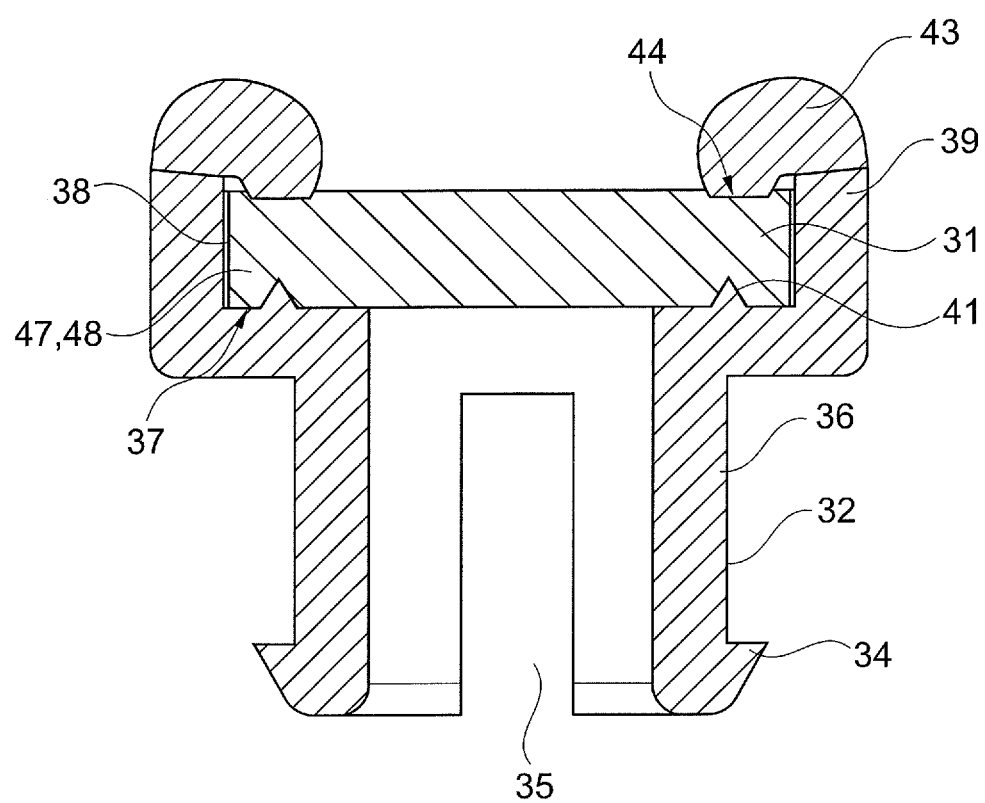
FIG. 4 a further preferred embodiment of a ventilation element for such a seal arrangement.

FIG. 4 shows a further ventilation element for a seal arrangement 10 according to the invention. With essentially the same structure as shown in FIG. 3, a deformation area 43 is provided on the collar 39 in this embodiment example, which is flanged in such a way that the membrane 31 or the porous body 47 is form-fittingly fixed in the receiving space 38. Furthermore, domes 41 are formed on the contact surface 37, which receive the membrane 31 or the porous body 47 or penetrate into them in order to produce a form fit. In this way, a pretensioning of the membrane 31 can be achieved in the area of the domes 41 in order to improve the sealing at these points.

Figure 5:
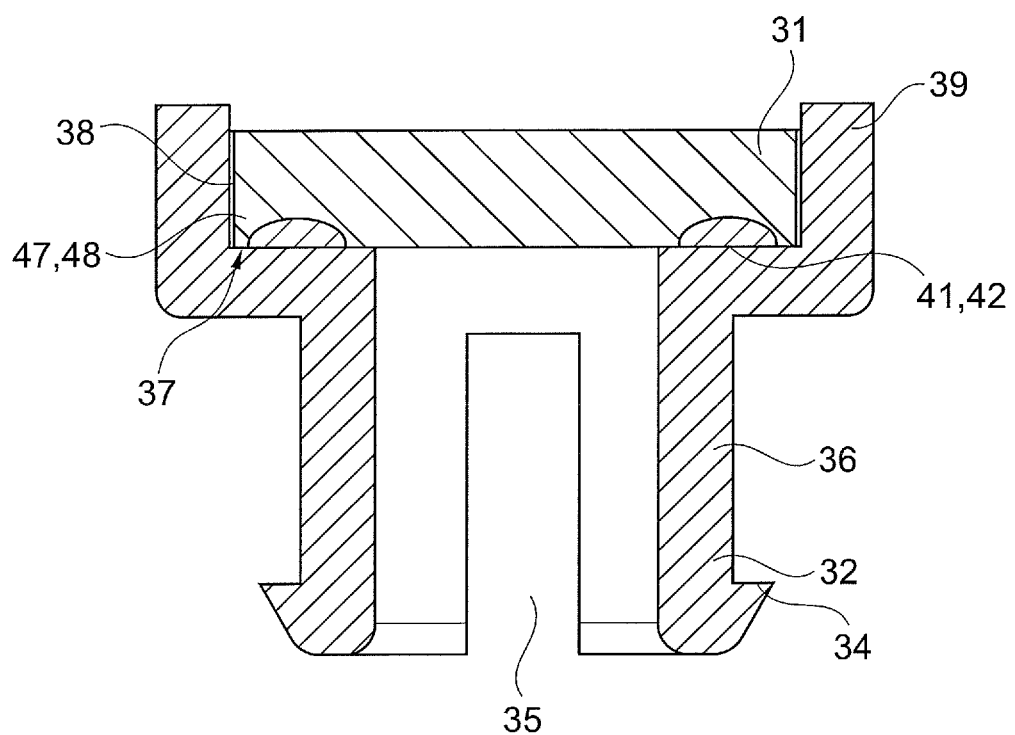
FIG. 5 a further preferred embodiment of a ventilation element for such a seal arrangement.

FIG. 5 shows a further embodiment of a ventilation element 30 for an advantageous seal arrangement 10. With essentially the same structure as shown in FIG. 3 and FIG. 4, the membrane 31 in this embodiment is connected to the contact surface 37 on the base body 32 of the ventilation element 30 by means of a material connection. For this purpose, the domes 41 are melted by means of a welding process, in particular by means of an ultrasonic welding process, and the melts 42 are joined to the membrane 31 by a material bond. In this way, the membrane 31 is comprised in the receiving space 38.

Figure 6:
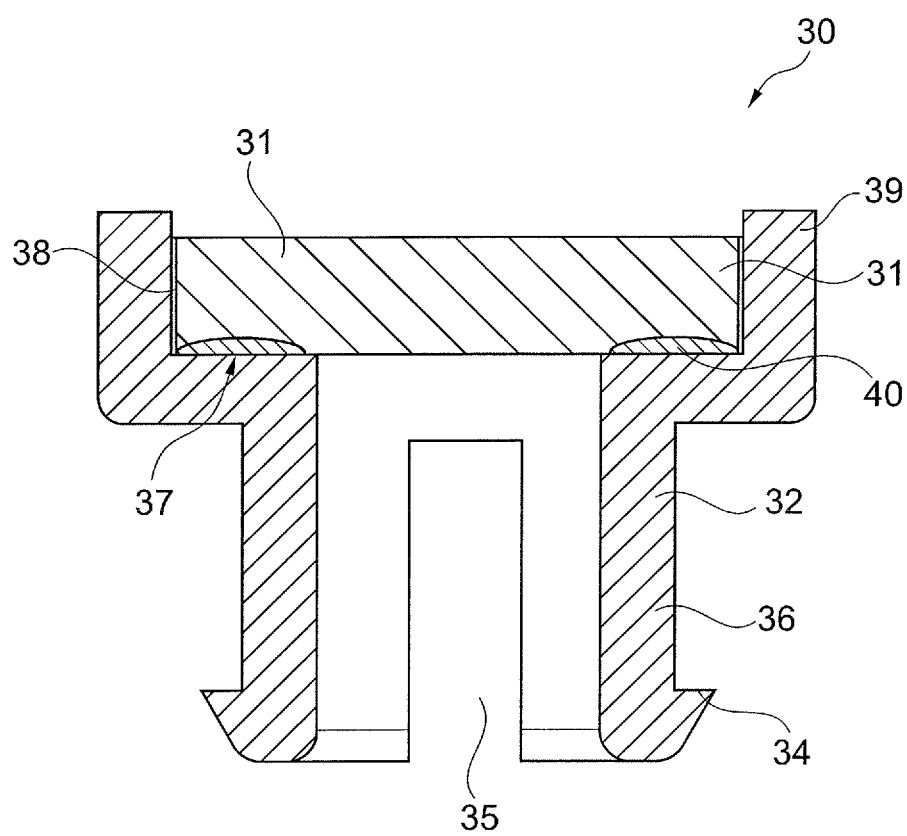
FIG. 6 further preferred embodiment of a ventilation element for such a seal arrangement.

FIG. 6 shows a further embodiment of a ventilation element 30 for an advantageous seal arrangement 10. With essentially the same structure as explained for FIG. 5, in this embodiment the membrane 31 is fixed to the contact surface 37 on the base body 32 of the fastening element 30 by means of an adhesive connection 40.

Figure 7:
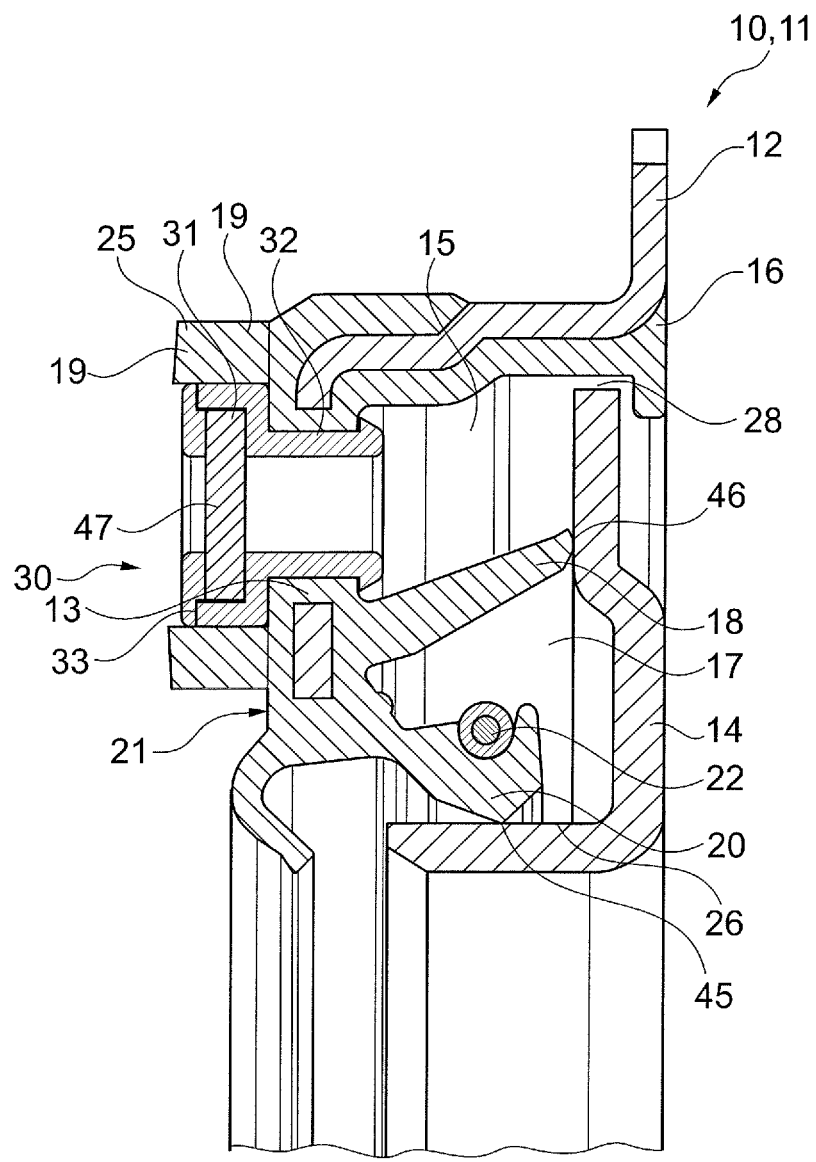
FIG. 7 a further preferred embodiment of a seal arrangement according to the invention in a sectional view.

FIG. 7 shows an alternative embodiment example for an advantageous seal arrangement 10. With essentially the same structure as explained for FIG. 2, the sealing element 16 in this embodiment example comprises an annular projection 19, which projects beyond an end face 21 of the first carrier element 12 and surrounds the collar 39 of the ventilation element 19. In this regard, the ventilation element 30 is inserted into the projection 19. The flexible webs 36 with the latching lugs 34 are guided through the opening 13 in the first carrier element 12 until the latching lugs 34 hook onto the first carrier element 12, thus forming a form-fitting connection with the first carrier element 12. The annular projection 19 serves to absorb centrifugal forces and to provide a radial seal between the ventilation element 30 and the sealing element 16. Alternatively, the first carrier element 12 can also be exposed from the sealing material of the sealing element 16 in the area of the opening 13, as shown in FIG. 9, in order to enable easier and immediate engagement of the latching lugs 34 in the base body of the first carrier element 12.

Figure 8:
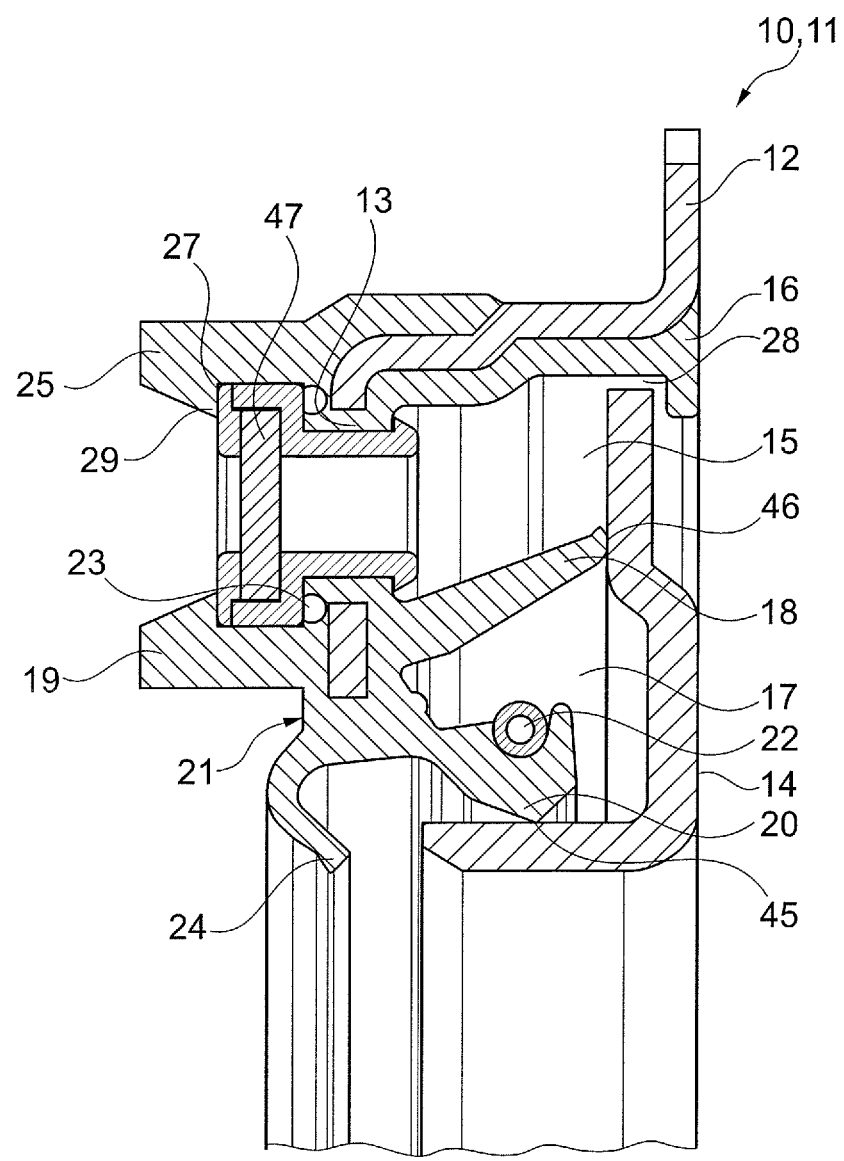
FIG. 8 a further preferred embodiment of a seal arrangement according to the invention in a sectional view.

FIG. 8 shows a further embodiment of an advantageous seal arrangement 10. With essentially the same structure as explained for FIG. 7, the projection 19 in this embodiment example comprises an elastic collar 25 on which an undercut 27 is formed. Thus, after the ventilation element 30 has been completely inserted into the opening 13, a further form-fitting connection can be made in a clamping area 29, whereby a particularly stable fixation of the ventilation element 30 in the opening 13 is possible. The construction is designed in such a way that the ventilation element 30 can be removed from the opening 13 without damage and in a reversible manner by pressing the webs 36 together and bending the collar 25 open. A relief groove 23 is formed on the sealing element 16, which enables material displacement of the sealing material of the sealing element 16, in particular when the ventilation element 30 is pressed into the first carrier element 12, and thus facilitates pressing of the ventilation element 30 into the first carrier element 12. In the pressed-in end position of the ventilation element 30, the undercut 27 can overlie the ventilation element 30 and additionally fix it in place. As an alternative to a clamp connection, the ventilation element 30 can also be fixed in the opening 13 of the first carrier element 12 by means of a hot riveting process.

In order to enable pressure equalization between the internal space 72 and the environment, an opening 13 is made in the first carrier element 12, which enables a fluidic connection between the internal space 72 and the first sealing space 15. In this case, the air flows through the ventilation element 30 for pressure equalization, so that a gas exchange between the internal space 72 and the first sealing space 15 of the seal arrangement 10 is possible, but liquid droplets cannot penetrate the ventilation element 30 and thus do not reach the internal space 72. The first sealing space 15 is ventilated and vented through the sealing gap 28, so that essentially ambient pressure prevails in the first sealing space 15. Alternatively, venting of the internal space 72 into the second sealing space 17 is also possible, wherein in this case an additional venting possibility from the second sealing space 17 into the first sealing space 15 is preferably provided. This can be done in particular through a slot or an opening in the first protective lip 18. Alternatively, the first carrier element 12 can also be exposed from the sealing material of the sealing element 16 in the area of the opening 13, as shown in FIG. 9, in order to enable easier and direct engagement of the latching hooks 34 in the base body of the first carrier element 12.

Figure 9:
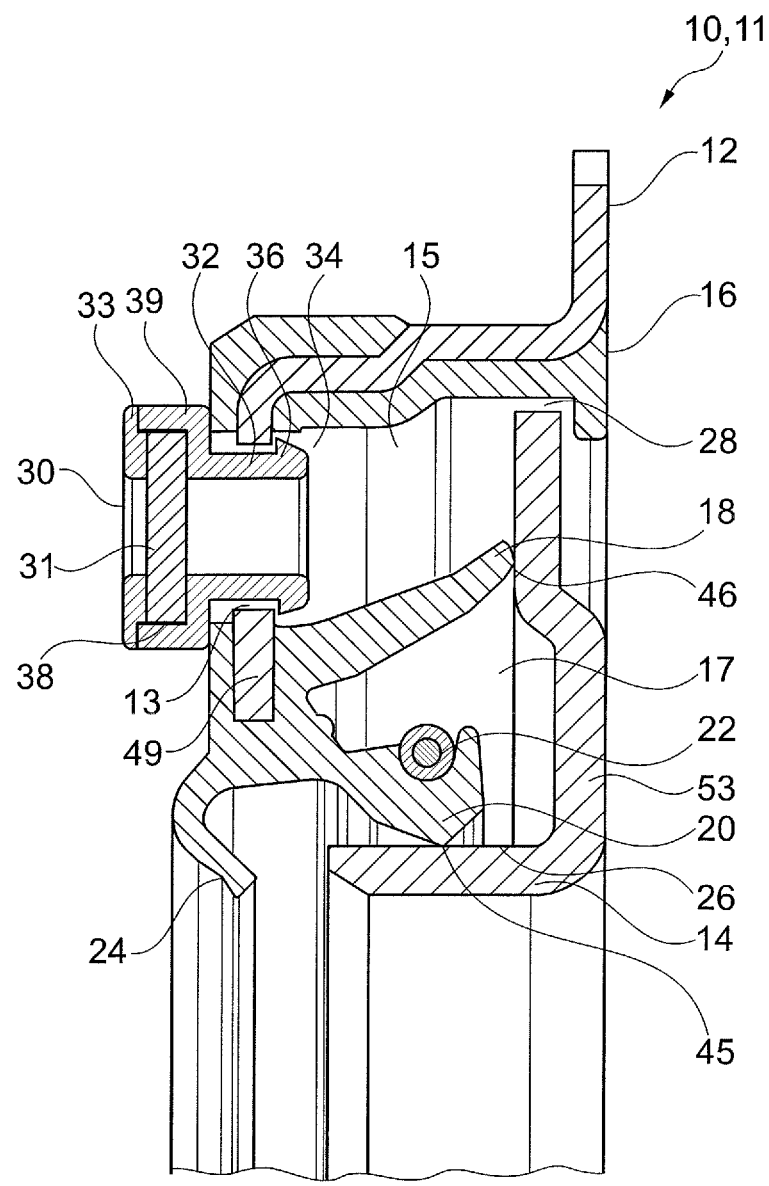
FIG. 9 a further preferred embodiment of a seal arrangement according to the invention in a sectional view.

FIG. 9 shows a further embodiment of an advantageous seal arrangement 10. With essentially the same structure as shown in FIG. 2, in this embodiment the first carrier element 12 is exposed from the sealing material of the sealing element 16 in the area of the opening 13. This allows the latching hooks 34 to hook directly into the first carrier element 12, which comprises a higher strength and flexural rigidity compared to the sealing material of the sealing element 16. This facilitates the engagement of the latching hooks 34 of the ventilation element 30. In addition, the strength of the latching connection can be increased and the risk of undesired release of the ventilation element 30 from the opening 13 can be reduced.

EMBODIMENTS

Embodiment 1. A seal arrangement (10) for sealing an internal space (72) between two components (50, 52, 70) rotatably mounted with respect to each other, comprising a first carrier element (12), which can be connected to the first component (70), and a second carrier element (14), which can be connected to the second component (50, 52), wherein a sealing element (16) is formed on at least one of the carrier elements (12, 14), which sealing element (16) rests against the respective other carrier element (12, 14) at least one contact point (45, 46), and wherein at least one opening (13) is incorporated into the first carrier element (12), into which opening a ventilation element (30) is inserted, characterized in that a receiving space (38) is formed on the ventilation element (30), which receiving space is delimited by a collar (39) on a base body (32) of the ventilation element (30), wherein a gas-permeable membrane (31) or a porous body (47) is arranged in the receiving space (38).

Embodiment 2. Seal arrangement (10) according to embodiment 1, characterized in that at least one web (36) is formed on the base body (32), which is received in the opening (13).

Embodiment 3. Seal arrangement (10) according to embodiment 2, characterized in that at least two webs (36) are formed on the base body (32), which are received in the opening (13), wherein the at least two webs (36) are separated from each other by a recess (35).

Embodiment 4. Seal arrangement (10) according to embodiment 2 or 3, characterized in that a latching element (34) is formed on one end portion of the web (36) or the webs (36) in each case, wherein the latching lug (34) connects the ventilation element (30) to the first carrier element (12) in a form-fitting manner.

Embodiment 5. Seal arrangement (10) according to embodiment 4, characterized in that the second carrier element (12) is designed to be free of sealing material in the area of the opening (13).

Embodiment 6. Seal arrangement (10) according to one of the preceding embodiments, characterized in that the receiving space (38) is closed by a cover (33) on the side facing away from the first carrier element (12).

Embodiment 7. Seal arrangement (10) according to one of the preceding embodiments, characterized in that the membrane (31) or the porous body (47) is connected to the ventilation element (30) by a material bond.

Embodiment 8. Seal arrangement (10) according to one of the preceding embodiments, characterized in that a contact surface (37) is formed on the base body (32) of the ventilation element (30), against which the membrane (31) or the porous body (47) rests.

Embodiment 9. Seal arrangement (10) according to embodiment 8, characterized in that at least one dome (41) is formed on the contact surface (37).

Embodiment 10. Seal arrangement (10) according to one of the preceding embodiments, characterized in that the collar (39) comprises a deformation area (43) which is deformed in such a way that a retaining portion (44) for the membrane (31) or the porous body (47) is formed.

Embodiment 11. Seal arrangement (10) according to one of the preceding embodiments, characterized in that a projection (19) is formed on the seal element (16), which projects beyond an end face (21) of the first carrier element (12), wherein the collar (39) of the ventilation element (30) is enclosed in the projection (19) or the collar (39) is sheathed by this projection (19) at least in portions.

Embodiment 12. Seal arrangement (10) according to embodiment 11, characterized in that a collar (25) is formed on the projection (19), which collar comprises an undercut (27) for form-fitting seating of the ventilation element (30).

Embodiment 13. Seal arrangement (10) according to one of the preceding embodiments, characterized in that a relief groove (23) is formed on the seal element (16) in a receiving region for the ventilation element (30).

Embodiment 14. Seal arrangement (10) according to one of the preceding embodiments, characterized in that the at least one opening (30) is made in a portion (49) of the first carrier element (12) which extends essentially perpendicular to the components (50, 52, 70).

Embodiment 15. Seal arrangement (10) according to one of the preceding embodiments, characterized in that the membrane (31) or the porous body (47) is made of a polymer material, in particular polytetrafluoroethylene (PTFE).

Embodiment 16. Seal arrangement (10) according to one of the preceding embodiments, characterized in that a sealing gap (28) is formed between the first carrier element (12) and the second carrier element (14).

Embodiment 17. Seal arrangement (10) according to one of the preceding embodiments, characterized in that the first carrier element (12) and/or the second carrier element (14) is coated at least in portions with a sealing material.

Embodiment 18. Seal arrangement (10) according to embodiment 17, characterized in that a sealing lip (20) is formed on the first carrier element (12), which sealing lip delimits a sealing space (15, 17) between the first carrier element (12) and the second carrier element (14).

Embodiment 19. Seal arrangement (10) according to embodiment 18, characterized in that the seal lip (22) abuts with a counter surface (26) on a portion (53) of the second carrier element (14) which extends substantially perpendicularly to the two components (50, 52, 70).

Embodiment 20. Seal arrangement (10) according to embodiment 18 or 19, characterized in that the opening (13) in the first carrier element (12) fluidically connects the internal space (72) with one of the sealing spaces (15, 17).

Embodiment 21. Method for manufacturing a seal arrangement according to one of the preceding embodiments, characterized in that an opening (13) is made in the first carrier element (12), wherein a ventilation element (30) is inserted into the opening (13) to enable pressure compensation between an internal space (72) sealed by the seal arrangement (10) and the environment.

The invention claimed is:

1. A seal arrangement for sealing an internal space between two components rotatably mounted with respect to each other, comprising:
    a first carrier element, which can be connected to a first component; and
    a second carrier element, which can be connected to a second component,
    wherein a sealing element is formed on at least one of the first carrier element and the second carrier element, which sealing element rests against the respective other carrier element of the first carrier element and the second carrier element at at least one contact point,
    wherein at least one opening is incorporated into the first carrier element, into which at least one opening a ventilation element is inserted,
    wherein a receiving space is formed on the ventilation element, which receiving space is delimited by a collar on a base body of the ventilation element,
    wherein a gas-permeable membrane or a porous body is arranged in the receiving space, and
    wherein at least two webs are formed on the base body, which are received in the at least one opening, wherein the at least two webs are separated from each other by a recess.

2. The seal arrangement according to claim 1, wherein a latching element is formed on one end portion of each web of the at least one web, wherein the latching element connects the ventilation element to the first carrier element in a form-fitting manner.

3. The seal arrangement according to claim 2, wherein the second carrier element is designed to be free of sealing material in the area of the at least one opening.

4. The seal arrangement according to claim 1, wherein the receiving space is closed by a cover on a side facing away from the first carrier element.

5. The seal arrangement according to claim 1, wherein the gas-permeable membrane or the porous body is connected to the ventilation element by a material bond.

6. The seal arrangement according to claim 1, wherein a contact surface is formed on the base body of the ventilation element, against which the membrane or the porous body rests.

7. The seal arrangement according to claim 1, wherein a projection is formed on the seal element, which projects beyond an end face of the first carrier element, wherein the collar of the ventilation element is enclosed in the projection or the collar is sheathed by this projection at least in portions.

8. The seal arrangement according to claim 7, wherein a collar is formed on the projection, which collar comprises an undercut for form-fitting seating of the ventilation element.

9. The seal arrangement according to claim 1, wherein the at least one opening is made in a portion of the first carrier element which extends essentially perpendicular to the components.

10. The seal arrangement according to claim 1, wherein the membrane or the porous body is made of a polymer material.

11. The seal arrangement according to claim 1, wherein a sealing gap is formed between the first carrier element and the second carrier element.

12. The seal arrangement according to claim 1, wherein the first carrier element is coated at least in portions with a sealing material.

13. The seal arrangement according to claim 12, wherein a sealing lip is formed on the first carrier element, which sealing lip delimits a sealing space between the first carrier element and the second carrier element.

14. The seal arrangement according to claim 13, wherein the seal lip abuts with a counter surface on a portion of the second carrier element which is configured to extend substantially perpendicularly to the two components.

15. The seal arrangement according to claim 13, wherein the opening in the first carrier element fluidically connects the internal space with the sealing space.

16. A method for manufacturing a seal arrangement according to claim 1, wherein the ventilation element is inserted into the at least one opening to enable pressure compensation between an internal space sealed by the seal arrangement and an environment.

17. A seal arrangement for sealing an internal space between two components rotatably mounted with respect to each other, comprising:
  a first carrier element, which can be connected to a first component; and
  a second carrier element, which can be connected to a second component,
  wherein a sealing element is formed on at least one of the first carrier element and the second carrier element, which sealing element rests against the respective other carrier element of the first carrier element and the second carrier element at at least one contact point,
  wherein at least one opening is incorporated into the first carrier element, into which at least one opening a ventilation element is inserted,
  wherein a receiving space is formed on the ventilation element, which receiving space is delimited by a collar on a base body of the ventilation element,
  wherein a gas-permeable membrane or a porous body is arranged in the receiving space,
  wherein a contact surface is formed on the base body of the ventilation element, against which the membrane or the porous body rests, and
  wherein at least one dome is formed on the contact surface.

18. The seal arrangement according to claim 17, wherein the collar comprises a deformation area which is deformed in such a way that a retaining portion for the membrane or the porous body is formed.

19. A seal arrangement for sealing an internal space between two components rotatably mounted with respect to each other, comprising:
  a first carrier element, which can be connected to a first component; and
  a second carrier element, which can be connected to a second component,
  wherein a sealing element is formed on at least one of the first carrier element and the second carrier element, which sealing element rests against the respective other carrier element of the first carrier element and the second carrier element at at least one contact point,
  wherein at least one opening is incorporated into the first carrier element, into which at least one opening a ventilation element is inserted,
  wherein a receiving space is formed on the ventilation element, which receiving space is delimited by a collar on a base body of the ventilation element,
  wherein a gas-permeable membrane or a porous body is arranged in the receiving space,
  wherein a relief groove is formed on the seal element in a receiving region for the ventilation element.

* * * * *